United States Patent [19]

Isoe

[11] Patent Number: 5,020,131
[45] Date of Patent: May 28, 1991

[54] TRANSPONDER FREQUENCY OFFSET COMPENSATION WITH RECURRENTLY ASSIGNED UNIQUE WORDS

[75] Inventor: Yasuhito Isoe, Tokyo, Japan
[73] Assignee: NEC Corporation, Japan
[21] Appl. No.: 295,276
[22] Filed: Jan. 10, 1989

[30] Foreign Application Priority Data

Jan. 11, 1988 [JP] Japan ................................. 63-4132

[51] Int. Cl.$^5$ .............................................. H04B 7/14
[52] U.S. Cl. ........................................ 455/10; 455/12; 455/21; 455/51
[58] Field of Search ............... 455/4, 12, 14, 51, 183, 455/197, 10, 313–315, 131, 52, 151, 161, 228, 20–23, 68, 71, 102; 375/37, 52, 57, 107, 110, 111; 370/104

[56] References Cited

U.S. PATENT DOCUMENTS 4,876,737 10/1989 Woodworth et al. ................ 455/12

Primary Examiner—Curtis Kuntz
Attorney, Agent, or Firm—Laff, Whitesel, Conte & Saret

[57] ABSTRACT

In a satellite communications system, satellite channels are divided into groups of successively adjacent channels which are covered by a range of frequency drifts caused by a satellite transponder and the channels of each group are assigned unique words of different bit patterns. Modulation systems of an earth station are associated respectively with demodulation systems of distant earth station via the respective satellite channels. A unique word is transmitted from each modulation system together with an information signal and received by an associated demodulation system of the distant earth station. A variable frequency carrier is synthesized in the demodulation system to demodulate the received signal to recover the information signal and the unique word. The recovered unique word is used to establish the frame start timing and the variable frequency carrier is controlled in response to the unique word to tune in the demodulation system to the desired satellite channel.

2 Claims, 3 Drawing Sheets

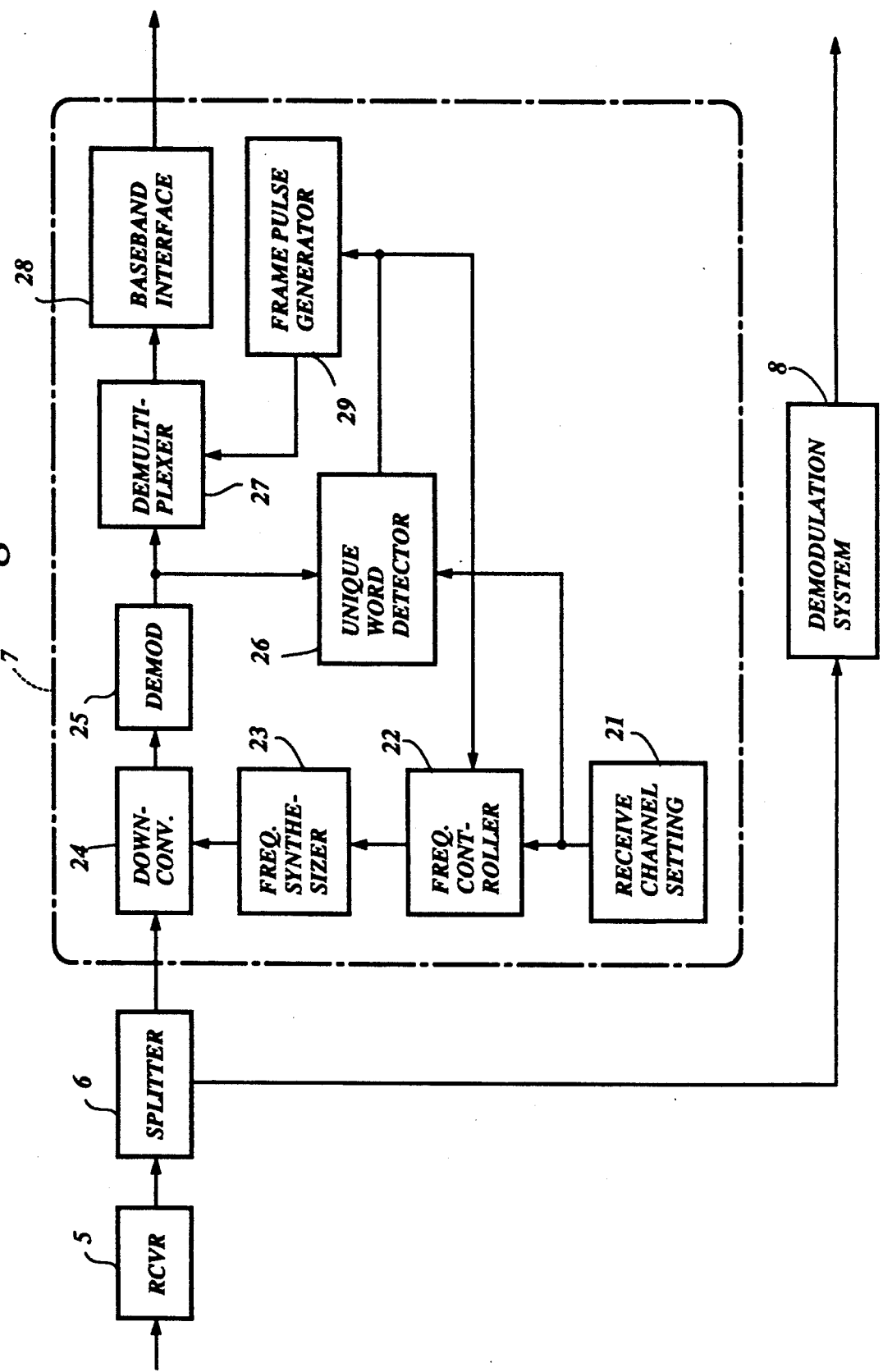

TRANSPONDER FREQUENCY OFFSET COMPENSATION WITH RECURRENTLY ASSIGNED UNIQUE WORDS

RELATED APPLICATION

The present invention is related to copending U.S. pat. application Ser. No. 259,849 of T. Hotta, filed Oct. 19, 1988, titled "Transceiver for Use in Earth Station in Satellite Communications System" and assigned to the same assignee as the present invention.

BACKGROUND OF THE INVENTION

The present invention relates generally to a satellite communications system, and more particularly it relates to compensation for the frequency drifts of transponder frequency translator.

In satellite communications network, all the frequencies of downlink channels vary simultaneously due to the frequency variation of a local oscillator of the satellite transponder in a range between 10 kHz and 100 kHz, whereas the frequency variation range of the earth station is usually less than 5 kHz. With single channel per carrier (SCPC) transmission having a separation of 25 kHz between adjacent channels, for example, the transponder frequency drift will cause an earth station to receive signals on a wrong channel which may be spaced more than one channel away from the intended channel. To compensate for the transponder frequency drifts, a pilot signal is currently transmitted on each down-link and the earth station uses it as a reference frequency to detect the amount of frequency deviation. However, the current practice adds to the total cost of the earth station. One solution to this problem would be to transmit a channel identification code identifying each of the uplink and downlink channels of a SCPC system. Since there is a substantial number of satellite links in such a system, the channel identification code will be represented by a long string of bits, which would lessen the transmission efficiency of the system.

SUMMARY OF THE INVENTION

It is therefore an object of the present invention to provide frequency offset compensation for satellite communications systems by use of a plurality of unique words of different bit patterns for a group of satellite channels, whereas in prior art satellite communications systems, a unique word of a single bit pattern has been in use for establishing the frame start timing.

A satellite communications system according to the present invention has a plurality of modulation systems in a transmitting earth station and a plurality of demodulation systems in a distant earth station which are respectively associated with the modulation systems via respectively associated satellite channels. The satellite channels are divided into a plurality of groups of successively adjacent channels which are covered by a range of frequency drifts caused by a satellite transponder. Each of the satellite channels (uplink and downlink) of each group is assigned a unique word which is exclusively unique in that group to serve dual functions of identifying each satellite channel within the same group and of establishing the frame start timing in an information signal. Each modulation system modulates an uplink carrier of the associated satellite channel with the information signal and the unique word and transmits it to the satellite transponder where the frequency of the uplink channel is translated to a corresponding downlink frequency. Each of the demodulation systems receives signals from the transponder through an associated downlink channel and synthesizes a variable frequency carrier. The received signal is demodulated with the variable frequency carrier to recover the information signal and the unique word. A frequency controller is provided to respond to the recovered unique word by controlling the variable frequency carrier to compensate for any frequency offset caused by transponder frequency drift and establishing the frame start timing in the recovered information signal.

BRIEF DESCRIPTION OF THE DRAWINGS

The present invention will be described in further detail with reference to the accompanying drawings, in which:

FIG. 1b is a block diagram of a receiver of the earth station according to a first embodiment of the present invention.

DETAILED DESCRIPTION

Figure 1A:
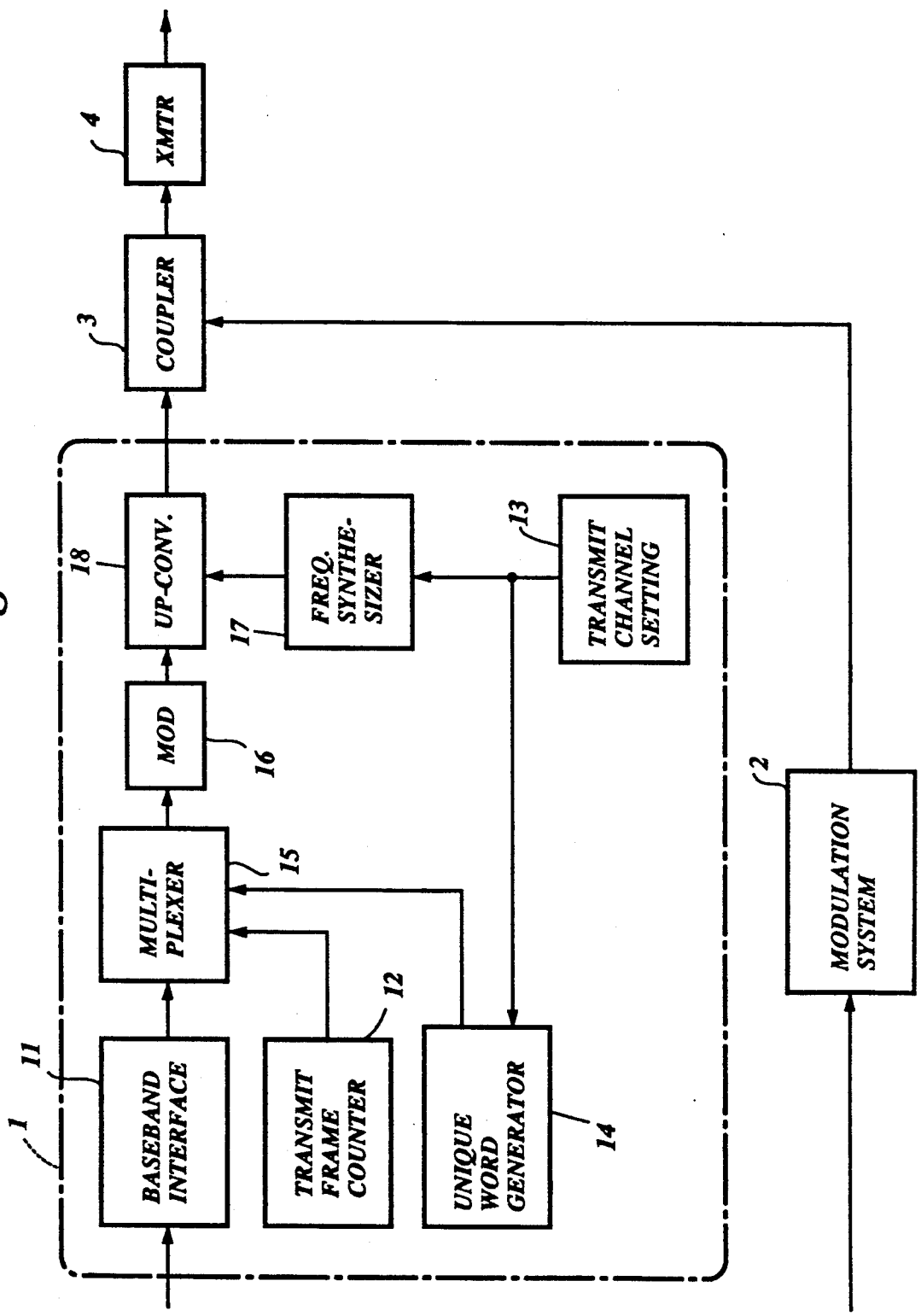
FIG. 1a is a block diagram of the transmitter of an earth station according to the present invention.

An earth station transmitter and an earth station receiver of a single channel per carrier (SCPC) system according to a first embodiment of the present invention are respectively shown in FIGS. 1a and 1b. The earth station transmitter shown in FIG. 1a comprises a plurality of modulation systems corresponding respectively to satellite's up-link channels. Typically, one hundred of such channels of different frequencies are provided in the earth station. Only two of such modulation system 1 and 2 of identical construction are illustrated. Each modulation system comprises a known baseband interface circuit 11 which converts a baseband signal according to a prescribed code format into a data bit stream by compressing the input signal. This is allow insertion of a frame pulse generated by a frame pulse generator 12 to establish the frame starting point and a unique word which is generated by a unique word generator 14 according to a carrier identification signal supplied from a transmit channel setting circuit 13. This carrier identification signal uniquely identifies the carrier frequency assigned to the system 1. The carrier identification signal is also applied to a frequency synthesizer 17, which supplies the assigned carrier frequency to an up-converter 18. The multiplexed data bit stream from the multiplexer 15 is modulated upon an intermediate frequency carrier by a modulator 16 and supplied to the up-converter 18 where the center frequency of the modulated signal is converted to a higher frequency, i.e, the carrier of modulation system 1 supplied from the frequency synthesizer 17.

The unique word generated by each modulation system identifies the own modulation system and defines the frame start timing. According to the present invention, all the uplink channels of the earth station are divided into groups of several channels each, typically five channels, and a set of different unique words are recurrently assigned to corresponding channels of different groups. For example, the whole channels are divided into groups of five channels CH1$_i$ through CH5$_i$ (where i represents group number) and particular unique words UW1 to UW5 are assigned respectively to the corresponding channels of different groups. The number of channels of each group is determined so that they encompass a range of frequencies in which the local oscillator of the satellite transponder is likely to deviate under hostile environment. Therefore, the carrier frequency of each downlink channel is likely to deviate by an amount corresponding to ±2 channels from the assigned frequency during a frequency conversion process in the transponder.

The output signal from each modulation system is combined with the other signals in a coupler 3 and fed to a transmitter 4 for transmission to the satellite transponder.

In the earth station receiver, shown in FIG. 1b, signals received from the satellite transponder are amplified by a receiver 5 and split into individual channel signals by a channel splitter 6 for coupling to demodulation systems, respectively. For the sake of simplicity, only two demodulation systems 7 and 8 of identical construction are illustrated. Each demodulation system comprises a down-converter 24 which converts the frequency of the received signal to a lower frequency signal using a carrier supplied from a frequency synthesizer 23. The output of down-converter 24 is supplied to a demodulator 25 for recovering the original data bit stream from which a unique word is detected by a unique word detector 26. The data signal contained in the recovered bit stream is detected by a demultiplexer 27 in response to a frame pulse supplied from a frame pulse generator 29 and fed to a baseband interface circuit 28 where the data signal are decompressed and the original baseband signal is recovered through a process inverse to that of the baseband interface circuit 11 of the transmitter.

If the received unique word is identical to the own unique word which is supplied from a receive channel setting circuit 21, unique word detector 26 generates an output which causes the frame pulse generator 29 to supply a frame pulse to the demultiplexer 27 to establish the frame start timing in the received data stream. The output of unique word detector 26 is further applied to a frequency controller 22, which is initially responsive to the output of receive channel setting circuit 21 to generate a signal corresponding to the carrier frequency of the own demodulation system. The output of frequency controller 22 is applied to the frequency synthesizer 23 to supply a carrier frequency to the down-converter 24.

Frequency controller 22, frequency synthesizer 23, down-converter 24, demodulator 25 and unique word detector 26 form a closed loop to provide automatic frequency control, so that, if there is a frequency deviation in the received signal, the unique word detector 26 supplies an out-of-tune signal to the frequency controller 22 until the intended unique word is detected. More specifically, frequency controller 22 makes a search for a desired carrier frequency by sweeping its output voltage across the range of transponder frequency drifts. If the frequency drift corresponds to one channel spacing higher than the original frequency, unique word detector 26 produces a tune-in signal when the synthesizer frequency has been increased by one channel from the intended frequency and causes the frequency controller 22 to cease the sweeping action and hold its output signal.

Since as many unique words are necessary as there are channels in the range of transponder frequency drifts, they can be composed of a few bits, and hence do not decrease the transmission efficiency of the system.

Figure 2:
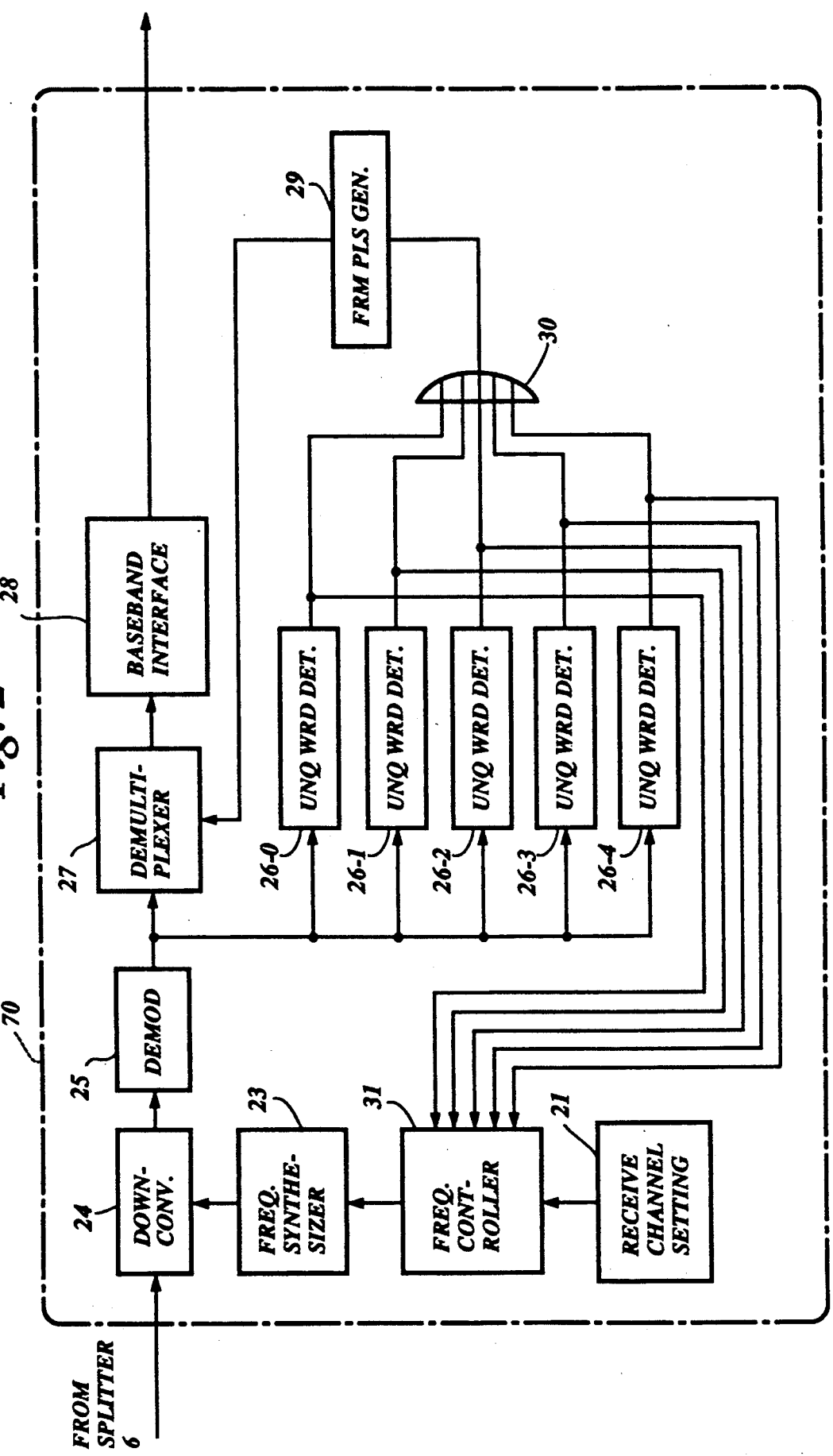
FIG. 2 is a block diagram of a modified form of the receiver of the present invention.

FIG. 2 is a block diagram of a modified embodiment of the present invention in which parts corresponding to those of FIG. 1b are marked with the same numerals as used in FIG. 1b. The modified demodulation system, which is shown at 70, compensates for the frequency deviation by detecting one of unique words which are assigned respectively to the channels of the same group. A plurality of unique word detectors 26-0 through 26-3 are connected to the output of demodulator 25 for respectively detecting unique words assigned to the same group. Each of the unique word detectors produces a pulse upon detection of a unique word and supplies it through an OR gate 30 to the frame pulse generator 29. The output of each unique word detector is also applied to a corresponding input terminal of a frequency controller 31. The signals applied to the input terminals of frequency controller 31 from unique word detectors 26-0, 26-1, 26-3 and 26-4 respectively cause it to supply corresponding frequency offset signals to the frequency synthesizer 23, whereas the signal applied from the unique word detector 26-2 causes it to holds its output signal.

For convenience, it is assumed that unique word detectors 26-0 and 26-1 detect unique words of adjacent channels on the higher side of the desired carrier, unique word detector 26-2 detects the unique word of the own system, and unique word detectors 26-3 and 26-4 detect unique words of adjacent channels on the lower side of the desired carrier. Frequency controller 31 initially responds to the output of channel setting circuit 21 by generating a frequency control signal which causes the frequency synthesizer 23 to generate the carrier frequency assigned to the system 70. If there is a frequency drift of two-channel spacing toward the higher end of the range from the desired frequency, unique word detector 26-4 will detect the unique word code of the channel having the lowest carrier frequency of the range of variations. The output of unique word detector 26-4 causes the frequency controller 31 to change its frequency control signal so that frequency synthesizer 23 increases its increases its carrier frequency by an amount corresponding to two-channel spacing. In this way, the desired signal can be detected by the down-converter 24 and the unique word detector 26-2 detects the channel ID code of the own system to hold the output of frequency controller 31 at the level which has been generated in response to the output of the unique word detector 26-4.

The foregoing description shows only preferred embodiments of the present invention. Various modifications are apparent to those skilled in the art without departing from the scope of the present invention which is only limited by the appended claims.

What is claimed is:

1. A single-channel-per-carrier satellite communications system having a source earth station and a destination earth station for establishing a plurality of satellite channels therebetween through a satellite transponder having a local oscillator used in common by said satellite channels for translation from up link frequencies to corresponding down link frequencies, said source earth station comprising a plurality of modulation systems corresponding respectively to said satellite channels, said destination earth station comprising a plurality of demodulation systems corresponding respectively to said satellite channels, said satellite communications systems comprising:

said modulation systems being divided into a plurality of groups corresponding respectively to a plurality of groups of said satellite channels, and said demodulation systems being likewise divided into a plurality of groups corresponding respectively to said groups of said satellite channels, the satellite channels of each group being covered by a range of frequency drifts caused by said satellite transponder, and a unique word being assigned to each modulation system and to each corresponding demodulation systems being exclusively unique in each group, the unique words assigned to each group being identical to those assigned to the other groups, each of said modulation systems transmitting the assigned unique word on a modulated up link carrier to said satellite transponder, each of said demodulation systems comprising;

demodulator means for demodulating a modulated down link carrier received from said transponder with a variable frequency carrier to produce a demodulator output;

unique word detector means for detecting whether said demodulator output contains a unique word assigned to the demodulation system;

variable frequency generator means responsive to said unique word detector means for generating a local carrier which varies in frequency continuously when said assigned unique word is not detected by said unique word detector means and assumes a constant frequency value which is assigned to the demodulation system when said assigned unique word is detected and applying said local carrier to said demodulator means as said variable frequency carrier; and means for establishing frame start timing in response to the detection of said assigned unique word by said unique word detectors means.

2. A single-channel-per-carrier satellite communications system having a source earth station and a destination earth station for establishing a plurality of satellite channels therebetween through a satellite transponder having a local oscillator used in common by said satellite channels for translation from up link frequencies to corresponding down link frequencies, said source earth station comprising a plurality of modulation systems corresponding respectively to said satellite channels, said destination earth station comprising a plurality of demodulation systems corresponding respectively to said satellite channels, satellite communications systems comprising:

said modulation systems being divided into a plurality of groups corresponding respectively to a plurality of groups of said satellite channels, and said demodulation systems being likewise divided into a plurality of groups corresponding respectively to said groups of said satellite channels, the satellite channels of each group being covered by a range of frequency drifts caused by said satellite transponder, and a unique word being assigned to each modulation system and to each corresponding demodulation systems, each unique word of both said modulation and demodulation systems being exclusively unique in each group, the unique words assigned to each group being identical to those assigned to the other groups, each of said modulation systems transmitting the assigned unique word on a modulated up link carrier to said satellite transponder, each of said demodulation systems comprising;

demodulator means for demodulating a modulated down link carrier received from said transponder with a variable frequency carrier to produce a demodulator output;

a plurality of unique word detector means for respectively detecting unique words assigned to the group of the demodulation system from said demodulator output;

variable frequency generator means responsive to said plurality of unique word detector means for generating a local carrier having frequency corresponding to one of detected unique words and applying said local carrier to said demodulator means as said variable frequency carrier; and means responsive to said plurality of unique word detector means for establishing frame start timing in respons to the detection of each of said assigned unique word by said unique word detector means.

* * * * *